United States Patent [19]
Sprenkle et al.

[11] Patent Number: 5,805,920
[45] Date of Patent: Sep. 8, 1998

[54] DIRECT BULK DATA TRANSFERS

[75] Inventors: Todd W. Sprenkle, Sunnyvale; Srinivasa D. Murthy; Anil Khatri, both of San Jose, all of Calif.

[73] Assignee: Tandem Computers Incorporated, Cupertino, Calif.

[21] Appl. No.: 556,618

[22] Filed: Nov. 13, 1995

[51] Int. Cl.$^6$ ..................................... G06F 13/00
[52] U.S. Cl. ....................... 395/821; 395/182.1
[58] Field of Search .................... 395/821; 895/182.1

[56] References Cited

U.S. PATENT DOCUMENTS

| | | | |
|---|---|---|---|
| 4,135,240 | 1/1979 | Ritchie | 395/491 |
| 4,400,778 | 8/1983 | Vivian et al. | 395/821 |
| 5,574,849 | 11/1996 | Sonnier et al. | 395/182.1 |

OTHER PUBLICATIONS

Hamacher et al., "Computer Organization", McGraw–Hill, Inc., ISBN 0–07–025681–0, p. 363, 1978.
"High Performance Storage System", The National Storage Laboratory.
"Parallel FTP Transfer", The National Storage Laboratory.
"HPSS to Parallel File System Transfer", The National Storage Laboratory.
"Network–attached peripherals (NAP) for HPSS/SIOF", Lawrence livermore National Laboratory.
"Software Components", The National Storage Laboratory.
"Parallel I/O Transfers", The National Storage Laboratory.
"Welcome to the FCA Server", Fibre Channel Association, Austin, Texas, Oct. 12, 1995.
"Fibre Channel Overview", Research Institute for Particle and Nuclear Physics, Budapest, Hungary.
"The Scalable I/O Facility", Lawrence Livermore National Laboratory, Oct. 6, 1995.

*Primary Examiner*—Tod R. Swann
*Assistant Examiner*—Felix B. Lee
*Attorney, Agent, or Firm*—Townsend and Townsend and Crew LLP

[57] ABSTRACT

A data processing system for transferring data is provided. This system includes central processing units (CPUs 20, 22, 24 and 26) and storage units (30 and 32 with 100–105 and 110–115) which are interconnected by a network (10). The CPUs (20, 22, 24 and 26) include a request process (133) and a storage process (130). The storage process (130) controls access to the storage unit (30 with 100–105 and 110–115). Software routines (220) are used to provide direct access to the storage unit (30 with 100–105 and 110–115) by the request CPU (22). The request CPU (20) is the CPU containing the request process (133). A virtual memory address for a buffer (160) of the request CPU (22) is created in the request CPU (22). The virtual memory address along with a storage unit access request are sent to the CPU (20) containing the storage process (130). A work request including the virtual memory address to sent from the storage process (130) to the storage unit (30 with 100–105 and 110–115). The data is then transferred directly between the request CPU (22) and the storage unit (30 with 100–105 and 110–115). The storage unit (30 with 100–105 and 110–115) then responds to the work request.

26 Claims, 11 Drawing Sheets

DIRECT BULK DATA TRANSFERS

BACKGROUND OF THE INVENTION

The present invention is directed generally to direct data transfers in data processing systems, and more particularly to direct bulk input/output transfers done in a system via a network that provides connectivity for processor and input/output communication.

Third party transfer systems provide various schemes for data transfer. For example, High-Performance Storage System (HPSS) is an advanced, distributed Hierarchical Storage Management system that is capable of coordinating concurrent input/output (I/O) operations over a network to achieve high aggregate I/O throughput. As developed at the National Storage Laboratory HPSS includes a Mover which is utilized for transferring data from a source device to a sink device in the HPSS. This Mover also performs a set of device control operation.

Fibre Channel (FC) also provides for third party transfer. FC allows for the transfer of data between workstations, mainframes, supercomputers, desktop computers, storage devices, displays and other peripherals. Finally, the IEEE Storage Systems Standards Working Group has created a draft Reference Model for Open Storage Systems Interconnection (OSSI). The following is from Version 5 of the draft OSSI document:

"2.3.3. Separation of Control and Data-flows

"The OSSI Model distinguishes control flows from data flows occurring between a client, a data source, and a data sink. Control flows carry requests, replies, and asynchronous notifications between a client and the data source or sink device. Control flows between the data source and the data sink carry source-sink protocol information to manage the flow of data. Data-flows pass only from a source to a sink. By logically separating control and data flows, the OSSI Model offers the possibility of optimizing each flow through separate implementation.

"2.3.4. Third-Party Transfers

"The OSSI Model allows data to flow directly between independent sources and sinks, under the control of a third party, initiating and controlling agent or client. Each entity separately performs operations such as data-flow control, error reporting, or initiating and terminating the transfer."

U.S. patent application Ser. No. 08/485,217, filed on Jun. 7, 1995 (Attached as Appendix A), incorporated herein by reference for all purposes, discloses a computing system that responds to the need for a multiple processing system in a reliable system area network that provides connectivity for inter processor and input/output communication. This patent application (referred to hereinafter as the Referenced Patent Application) teaches a system that provides a fail-fast, fail-functional, fault-tolerant microprocessor system and an architecture that includes a system area network (SAN) cloud formed by a number of router devices and associated interconnecting links, that enables any central processing unit (CPU) to communicate with any input/output (I/O) controller. This architecture is illustrated herein at FIG. 1. Therefore, any I/O controller can be addressed by any CPU, and any CPU can be addressed by any I/O controller.

Broadly, the invention disclosed in the Referenced Patent Application includes a processing system composed of multiple sub-processing systems. Each sub-processing system has, as the main processing element, a CPU. This CPU comprises a pair of processors operating in a lock-step synchronized fashion to execute each instruction from an instruction stream simultaneously. Each of the sub-processing systems connects to an I/O system area network (SAN) that provides redundant communication paths between various components of the larger processing system. These various components include a CPUs and assorted peripheral devices (e.g., mass storage units, printers, and the like). These redundant communication paths can also be between sub-processors that make up the larger overall processing system. Communication between any component of the overall processing system (e.g., between a first CPU and a second CPU, or between a CPU and any peripheral device) is implemented by forming and transmitting messages which are included in packets. In the preferred embodiment, each packet contains 64 bytes of data. These packets are routed from the transmitting or source component (e.g., a CPU) to a destination element (e.g., a peripheral device) by a system area network structure.

This system area network structure includes a number of router elements that are interconnected by a plurality of interconnecting links. The routers disclosed in the Referenced Patent Application, which route packets from the source of the packet to the destination of the packet, do not themselves originate the packets. Routers act as packet switches by taking an incoming packet on one link and sending it out on the appropriate link for its destination. The router elements are responsible for choosing the proper or available communication paths from a transmitting component of the processing system to the destination component. The communication paths are based upon information contained in the message packet. Thus, the routing capability of the router elements provide the CPUs' I/O system with a communication path to the peripheral devices.

The architecture disclosed in the Referenced Patent Application uses a disk process pair to manage each disk, one half of the disk process pair will be the primary disk process and the other half will be the backup disk process. Additionally, the disk processes controlling disks on a SCSI chain are not confined to two CPUS, and the disk processes can be configured to run among multiple CPUs. When the SAN cloud of the Referenced Patent Application is being utilized, both CPUs and controllers can originate read and write server net cloud transactions for the CPU memory.

FIG. 1 illustrates an example of a storage architecture. This configuration shows CPUs 20, 22, 24 and 26 along with disk/storage controllers 30 and 32 are connected to SAN cloud 10. Controllers 30 and 32 include I/O packetizers 34 and 36 along with SCSI chips 40, 42, 44 and 46. I/O packetizers convert data packets from the network protocol into the bus protocol. This configuration also shows six SCSI disk pairs 100–105 and 110–115 hanging off two SCSI chains 120 and 122 (for a total of 12 storage disks 100–105 and 110–115). The disks are configured as primary disks 100 ($A), 101 ($B), 104 ($E), 105 ($F), 111 ($D) and 114 ($C) and mirror disks 102 ($C), 103 ($D), 110 ($F), 112 ($B), 113 ($E) and 115 ($A). The four CPUs (CPU0 20, CPU1 22, CPU2 24 and CPU3 26) accommodate disk processes which control the six disk pairs 100–105 and 110–115. The primary disk processes ($A-P, $B-P, $C-P, $D-P, $E-P and $F-P) and the backup disk processes ($A-B, $B-B, $C-B, $D-B, $E-B and $F-B) are scattered among the four CPUs 20, 22, 24 and 26. For example, the primary disk process 130 ($A-P) for storage disk 100 ($A) may be located in CPU0 20, and the backup disk process 133 ($C-B) for storage disk 102 ($C mirror) may be located in CPU1 22. Disk Processes 130–141 can be located (as shown in FIG. 1) in more than two CPUs. In another configuration, eight storage disk pairs can be hanging off two SCSI chains (for a total of 16 storage disks), and an extra SCSI chip can be located in each controller for external storage devices.

As an example of the operation of the system shown in FIG. 1, assume a request process located in CPU1 22 wishes to write to disk 100. To do so, the request process will first send a write data message to the (primary) disk process 130 located in CPU0 20 (disk process 130 controls disk 100). Disk process 130 then computes checksums over the data. Checksums ensure data integrity for the block of data being transferred. The block of data is then transferred from CPU0 20 to disk 100 through SAN cloud 10. When this transfer is completed, disk process 130 replies to request process 145.

FIG. 2 illustrates an example of disk transfers. FIG. 2 has most of the same elements included in FIG. 1. In addition to these elements, a buffer 150 is shown located in CPU0 20 and a buffer 160 located in CPU1 22 are shown. In this example, the request process and the disk process are located in different CPUs. These processes can also be located in the same CPU. At step 1, the request process wants to write data from buffer 160 to $A disk 100. Therefore, the data located in buffer 160 is sent to buffer 150 located in CPU0 20 because disk process 130, located within CPU0 20, is the disk process for $A disk 100. At step 2, disk process 130 writes the data located in buffer 150 to disk 100. At step 3, disk process 130 replies to request process 145 because the transfer of data to disk 100 is complete.

In this arrangement, data is copied from the CPU with the request process to an intermediate CPU with the associated disk process and then from that intermediate CPU to the disk. During the transfer of data between CPUs and storage disks, it is desirable to remove similar data copies.

SUMMARY OF THE INVENTION

The present invention provides a data processing system for transferring data. This system includes central processing units (CPUs) and storage units which are interconnected by a network. The CPUs include a request process and a storage process (also referred to as a disk process). The storage process controls access to the storage unit. Software routines are used to provide direct access to storage unit by the request CPU (the CPU containing the request process). A virtual memory address for a buffer of the request CPU is created in the request CPU. The virtual memory address along with a storage unit access request are sent to the CPU containing the storage process. A work request including the virtual memory address is sent from the storage process to the storage unit. The data is then transferred directly between the request CPU and the storage unit. The storage unit then responds to the work request.

Further aspects and features of the present invention will become evident to those skilled in this art upon a reading of the following detailed description of the invention, which should be taken in conjunction with the accompanying drawings.

DESCRIPTION OF THE PREFERRED EMBODIMENT

The present invention provides for direct bulk data transfers in a reliable system via a network that provides connectivity for processor and I/O communication. This direct data transfer retains the disk process pair arrangement while eliminating the copying of data between the CPU running the request process and the CPU running the disk process. Thus, the data is copied directly between the request process' buffer and the storage unit. As a result, (1) the network bandwidth is saved because the data is not transferred to the buffer of the disk process, (2) the context switch time is saved because the disk process does not have to receive the data into its buffer, (3) the input/output (I/O) latency is reduced because a buffer copy is avoided, and (4) work is "off-loaded" from the message system because the message system does not send the data between the request process and the disk process. This message system is used for interprocessor communication.

Figure 3:
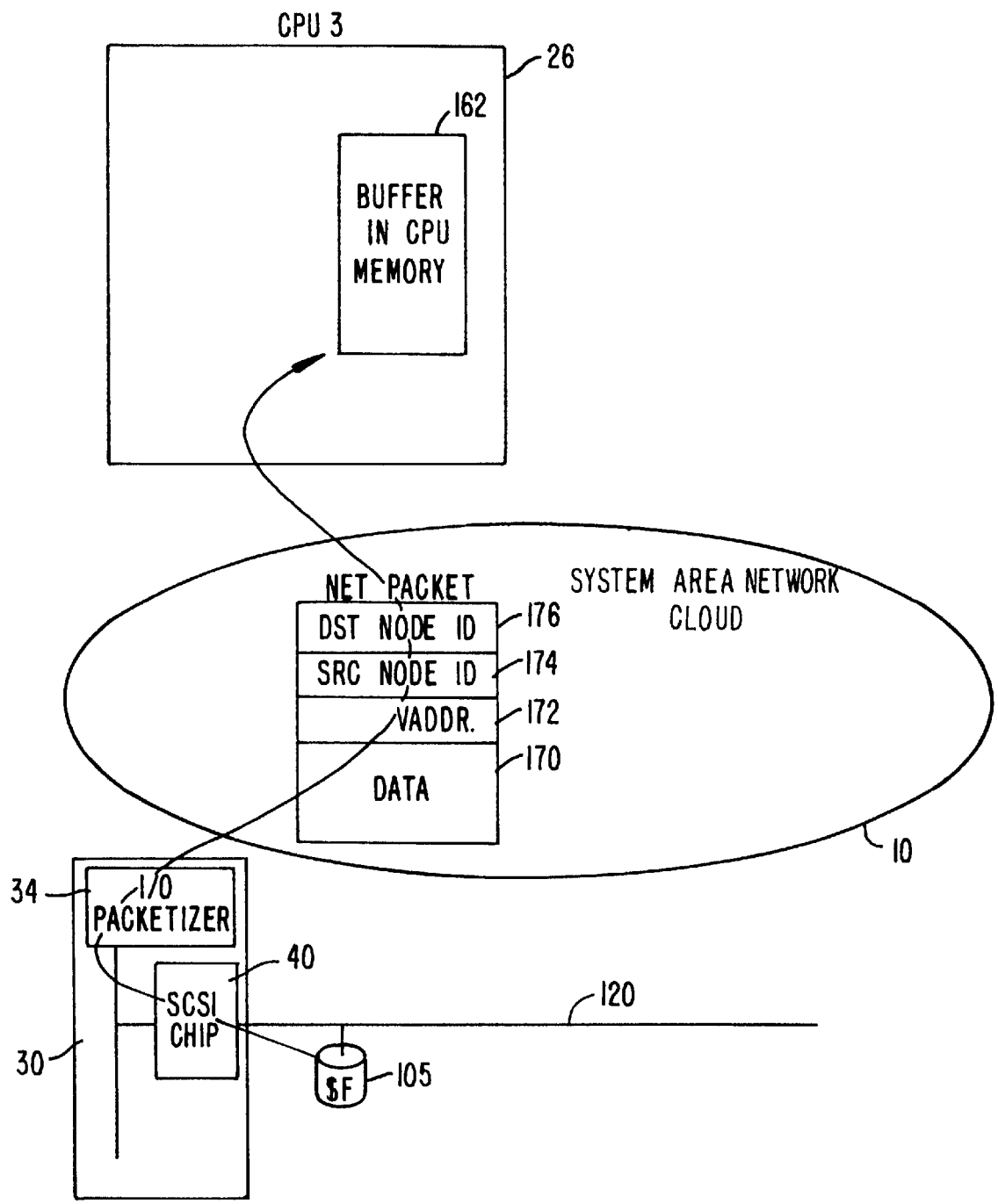
FIG. 3 illustrates the transfer of data occurring when the controller is "pushing"

FIG. 3 illustrates the transfer of data occurring when the controller 30 is "pushing." For example, when data is transferred from disk 105 to CPU memory, the controller 30 is "pushing" data 170 to CPU memory. This is also referred to as a "read" operation. In this illustration, both the request process and disk process are located in CPU3 26. This CPU3 26 sends controller 30 a virtual address 172 that identifies a CPU memory buffer 162 in CPU3 26 which will receive data 170, along with the parameters associated with the data transfer (e.g., a remote node identification). The virtual address 172 includes information used to obtain the physical (memory) address of buffer 162. This virtual address 172 will be later translated back into a physical address. In the preferred embodiment, the virtual address 172 includes both a page number and an offset which need to be used together to determine the associated physical address. Therefore, more than one virtual address 172 can be provided for one buffer. The virtual address is disclosed in greater detail in the Referenced Patent Application. Buffer 162 belongs to the request process. The parameters associated with the transfer are sent from CPU3 26 to controller 30 via a "work request." With this information, controller 30 can transfer data 170 directly from an I/O device (e.g., $F disk 105) to the request process' memory. In a similar arrangement, the CPU can "write" to the I/O device (the disk). This is referred to as the controller "pulling" the data from the CPU memory. In this arrangement CPU3 26 sends controller 30 the server net virtual address 172 for the CPU buffer 162 containing the data, along with the parameters associated with the I/O space. Again, these parameters are included in a "work request." With this information, controller 30 can transfer the data from CPU memory to disk device 105. Therefore, data is transferred between a CPU with a nondisk process and a disk without transferring the data through the CPU running the associated disk process.

Communications through the SAN cloud are by packets that contain a header with entries 174 and 176, respectively identifying the source node and destination node for the packet. This identification is in the form of a node identification (ID). In the preferred embodiment, only CPUs and other peripheral devices have node ID. Each packet header also contains a transaction type field (not shown in FIG. 3) that indicates the type of packet. When the packet type is a read or a write, the packet elicits an acknowledgement from the destination node. For read packets, this acknowledgment contains the data to be returned to the node which is performing the read. For the write packets, this acknowledgment returns with a successful or failure status for the write operation.

The virtual address 172 specified in the server net read/write packets is not a physical address at the destination node, but instead an address that is permission checked and then, if the permission check passes, is translated into a physical address. Permission checking is a form of, for example, source node identification validation, translation type checking (i.e., read/write permissions) and also bounds checking. An address validation and translation (AVT) table is used for the translation and permission checking applied to virtual addresses. In order to validate the source node ID, the source ID field of an accessed AVT entry specifies the source that corresponds to the AVT entry being used. This source ID field is compared to the source ID contained in the requesting message packet, such that a mismatch will result in an AVT error interrupt which denies access. Transaction type checking involves checking to determine if access for either a read or a write can be granted. For bounds checking, the lower bound field and the upper bound field of the AVT entry is compared to an offset value to determine if access will be granted. This type of permission checking is described in greater detail in the Referenced Patent Application (e.g., see pages 55–61 and FIGS. 13A–13C).

Figure 1:
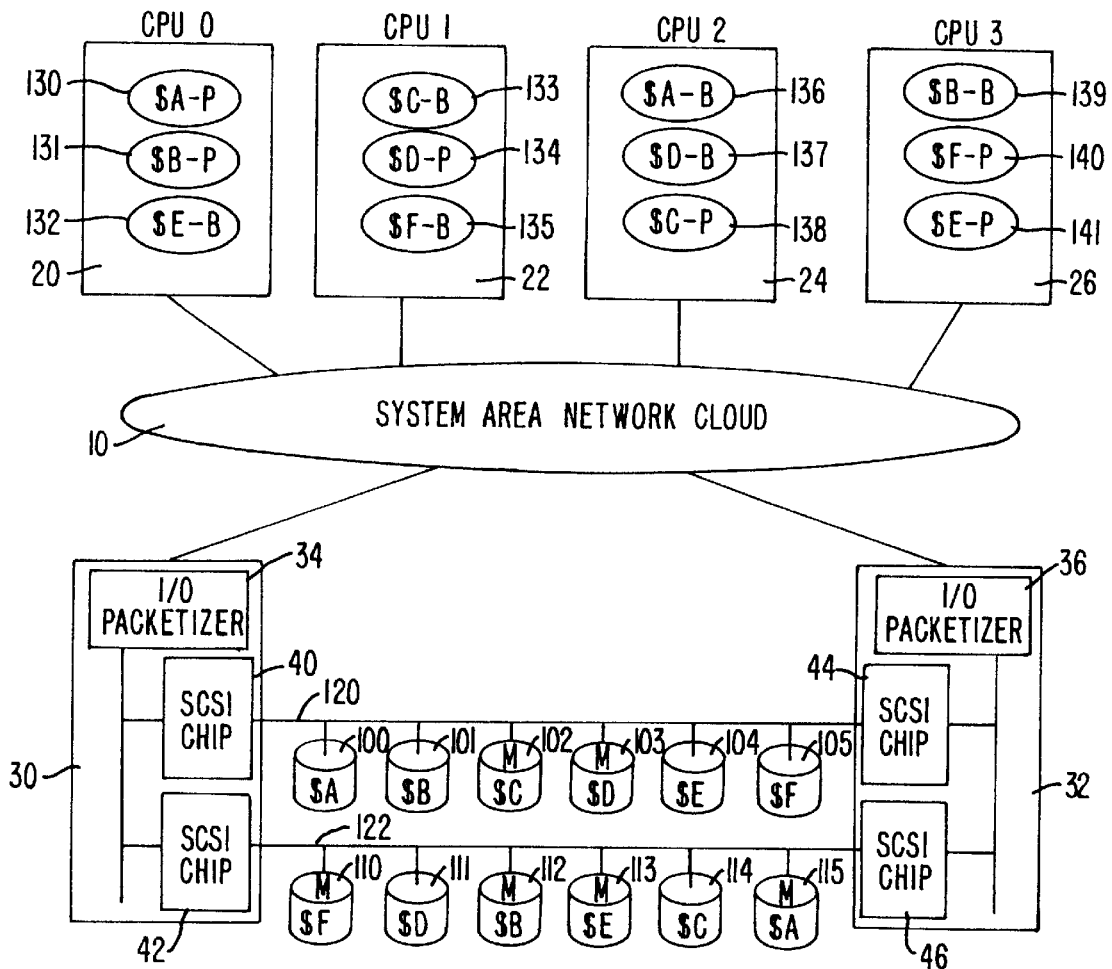
FIG. 1 illustrates an example of a storage architecture.
Figure 2:
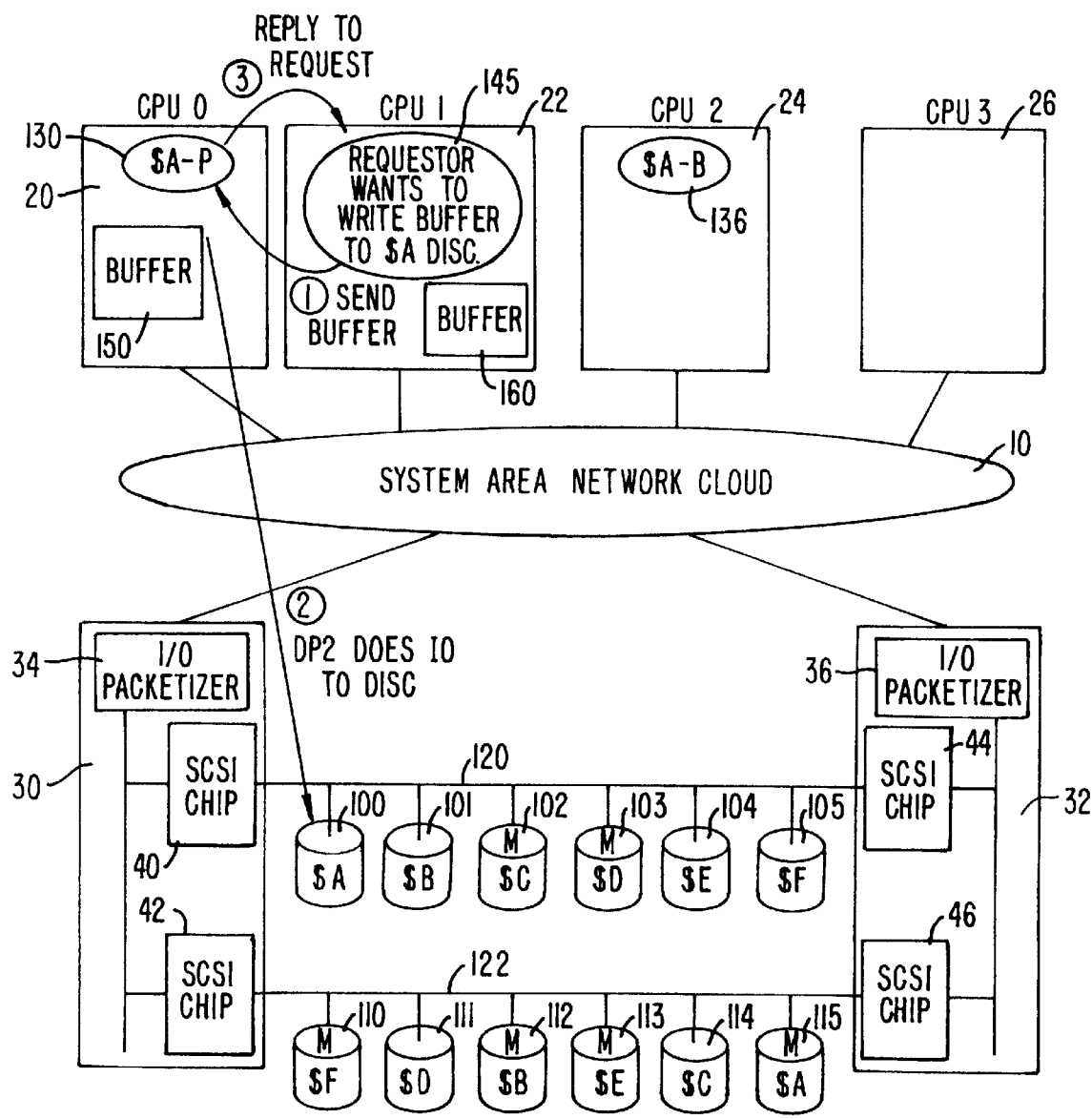
FIG. 2 illustrates an example of disk transfers.

The hardware direct memory access (DMA) engine used to achieve the transfer of data is also referred to as the block transfer engine. In the preferred embodiment, the block transfer engine can compute checksums on memory buffers asynchronously, and at least one DMA engine is located in each CPU. As stated above, checksums ensure data integrity for the block of data being transferred. As stated above, any CPU 20, 22, 24 or 26 (FIG. 2) can delegate a buffer to the block transfer engine for transferring packets of data over the SAN cloud 10. In addition, any CPU 20, 22, 24 or 26 can delegate a buffer to the block transfer engine for computing the checksums and for depositing the checksums in another buffer. Finally, in the preferred embodiment, a DMA engine located in SCSI chip 40 performs the "pushing" or the "pulling" for each data transfer (for the disk "read" or "write").

As stated above, when the direct data transfer of the present invention takes place, the data is not transferred between the request originating CPU and the CPU containing the disk process. Instead, a virtual address is created and used. This virtual address is used by the controller to perform the direct data transfer. Again, there are two types of data transfers in this process. The first is a disk write operation which involves creating and using a virtual address. The controller uses this virtual address to do the necessary operations for the disk write. Thus, the AVT entry for the virtual address (for the request process' buffer) specifies the node ID for the controller which needs to access the request process' buffer.

For disk write operations, the originating CPU running the request process first computes the checksums of the data before issuing a request to the disk process. After the request process creates the virtual address for its buffer, the request process passes that virtual address to the disk process. The disk process cannot use this virtual address to access the request process' buffer because the source ID validation check would fail. After receiving the virtual address, the disk process sends a "work request" to the controller specifying (1) the handle to the node ID for the CPU originating the request (the CPU containing the request process) and (2) the virtual address for the buffer associated with the request process. The controller then "pulls" the data from the CPU memory buffer using the virtual address because this is a write operation. At the end of this transfer of data, a notification (typically in the form of an interrupt) is transmitted back to the CPU containing the disk process. The disk process then replies to the request process to notify it of the completion of the data transfer. Additional information related to the AVT table and the address is provided in the Referenced Patent Application.

Figure 4:
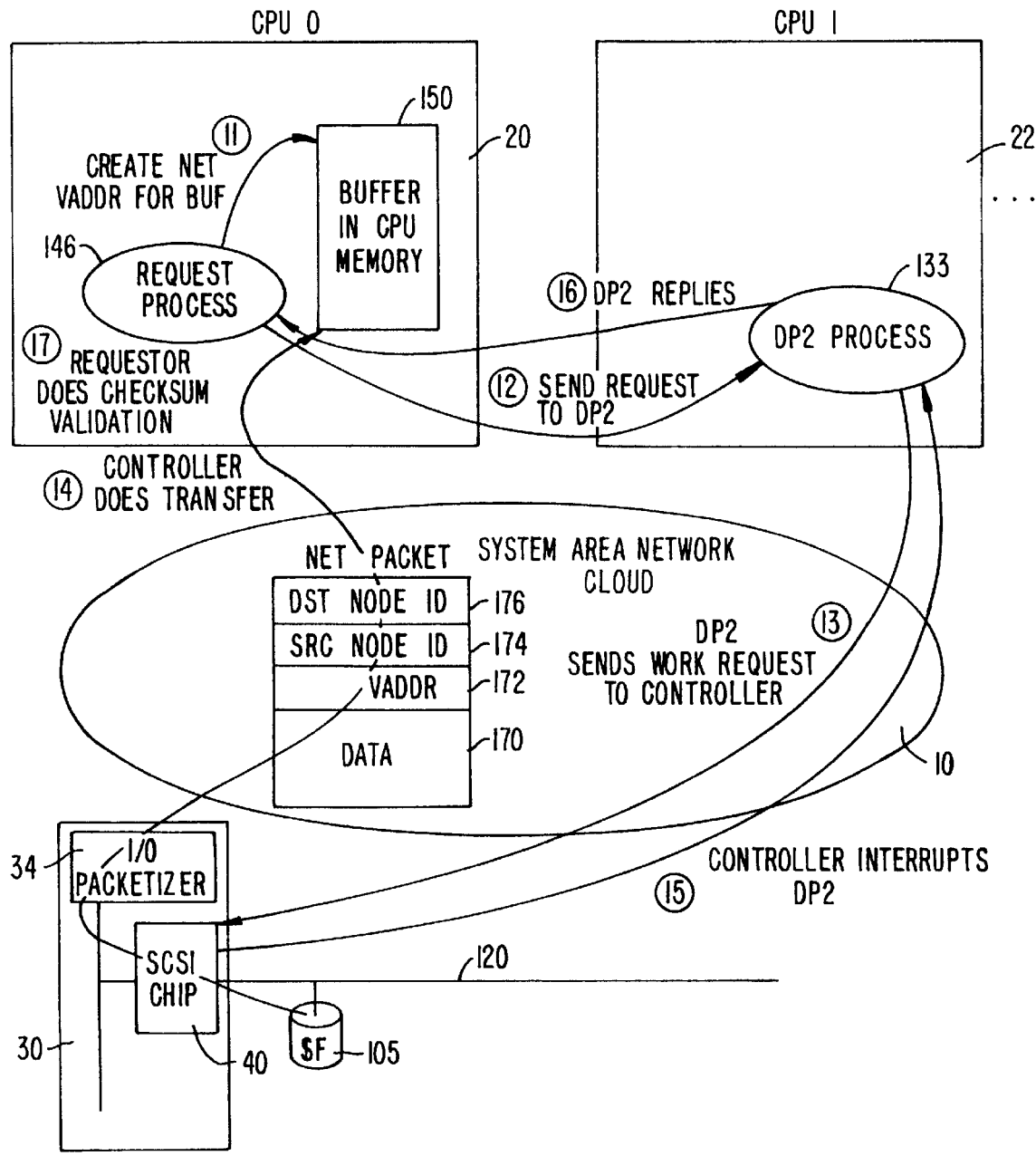
FIG. 4 illustrates an example of a direct data transfer for a disk read.

The second type of data transfer is for a disk read. FIG. 4 illustrates an example of a direct data transfer for a disk read. At step 11, the virtual address for memory buffer 150 is created by the CPU0 20 that will request the read. Buffer 150 is associated with the request process 146. At step 12, the request process 146 sends a request to disk (Dp2) process 133 resident on the processor CPU122. At step 13, disk process 133 sends a work request to controller 30. At step 14, controller 30 performs a transfer of data from $F disk 105 to buffer 150. Step 14 is performed until all of the requested data has been sent to buffer 150. When the data transfer is complete, controller 30 interrupts disk process 133 at step 15. At step 16, disk process 133 informs request process 146 that the data transfer has ended. At step 17, the originating CPU running the request process computes the checksums of the buffer and then validates it before accepting the data.

Figure 5:
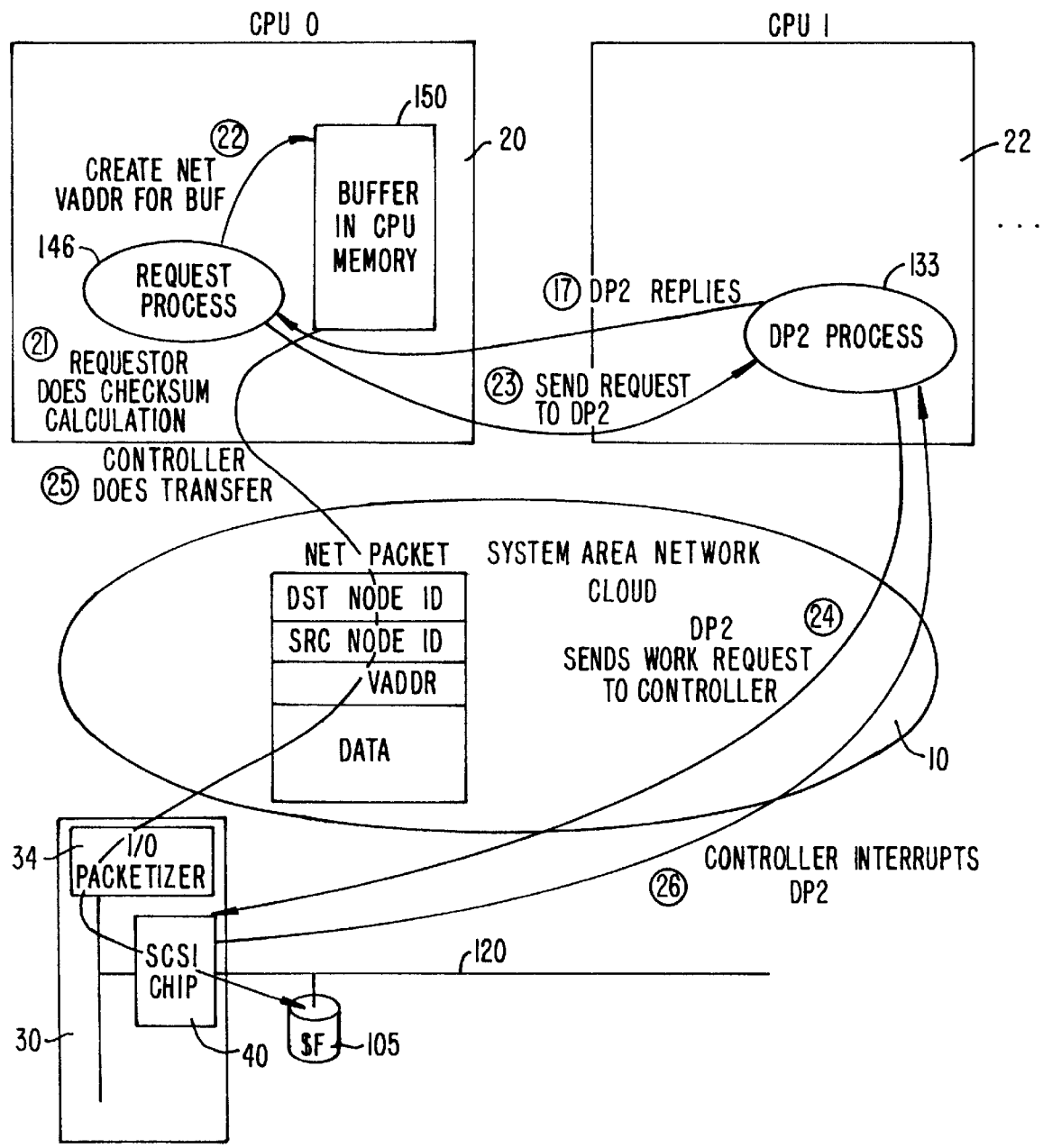
FIG. 5 illustrates an example of a direct data transfer for a disk write.

Direct data transfers for disk writes are very similar to disk reads, except that (1) the checksums are computed by the request process before a request is sent to the disk process and (2) the direction of the transfer of data is from the CPU memory to the disk.. FIG. 5 illustrates an example of a direct data transfer for a disk write. At step 21, the request process 146 performs the checksums calculations. At step 22, request processor 146 creates a virtual address for memory buffer 150 and for the checksums buffer. At step 23, request process 146 sends its request to disk process 133. At step 24, disk process 133 sends a work request to controller 30. At step 25, controller 30 transfers the data from buffer 150 and the checksums from the checksums buffer to $F disk 105. After all of the requested data have been transferred from buffer 150 to disk 105, controller 30 interrupts disk process 133 at step 26. At step 27, disk process 133 informs request process 146 that the data transfer is complete.

The software for the direct data transfer allows the data to be sent directly to (or from) the CPU running the request process from (to) the disk device. To perform direct data transfer in the preferred embodiment, a device handle is utilized. This device handle provides the remote node ID to the AVT entry for the data transfer. Only the controller identified by this node ID can access the entry in the AVT table for the data transfer. The AVT table maps the requesting CPUs buffer to the virtual address space, so that it is accessible to the controller with the correct node ID. When activated, the device handle points to the data transfer parameters which include the node ID. To obtain this device handle, a code routine labeled "TSER_DEVINSTALL" is used in the preferred embodiment. Therefore, the parameters associated with the remote node are specified to the code when this routine is called.

In the preferred embodiment, the system initiates direct data transfers and performs a TSER_DEVINSTALL when a request for data transfers is recognized. When the direct data transfer process is complete, the device handle is returned by calling, for example, the TSER_DEVREMOVE routine. In a second embodiment, either global device handles or stack/module/slot to device handle translation caches are located in each CPU. In this embodiment, the TSER_DEVINSTALL and TSER_DEVREMOVE routines are not invoked.

Users can indicate their desire to use direct data transfers in several ways. For example, SETMODE 141 can enable a large data transfer mode for disk file transfers. This SETMODE enables users to specify that they desire large, unstructured accesses to disk files that bypass the disk process cache. In another example, BULKREAD and BULKWRITE can be used as internal tools when a backup, restore, dump, or the like is requested. BULKREAD and BULKWRITE also bypass the disk process cache. Thus, if a BULKREAD or a BULKWRITE or a SETMODE 141 is enabled for file transfers, direct data transfer will be used to perform the transfer task.

In the preferred embodiment, when SETMODE 141 is indicated, a message is sent to the disk process to flush its cache. As a part of the reply to this SETMODE request, the disk process returns an indication to the file system that it can support the direct data transfer. The disk process also returns two IDs to the file system. These IDs constitute the two primary paths to the relevant disk and its mirror disk. Both IDs are used when doing a write to the disk devices, and only one ID is used for a read operation. When the file system receives the response from the disk process, it deciphers the reply and calls a direct data transfer routine to install the two IDs with the code.

Similarly, when BULKREAD or BULKWRITE is indicated, the file system sends a normal bulk data transfer request to the disk process. When possible, the disk process responds to the file system indicating that it can support the direct data transfer. At this time, the disk process also returns the two IDs that constitute the two primary paths to the relevant disk and its mirror. The file system then uses direct data transfer for subsequent bulk data transfer calls, and also calls a direct data transfer routine to install the two server net IDs with the code.

As part of the direct data transfer session establishment (installing the two IDs), the direct data transfer routine also acquire space for a transfer information block (TIB) from the FLEXPOOL. The TIB is used for the interface between the direct data transfer routines and the code. The TIB is also used by the direct data transfer routines to request that the code use the DMA engine to do the checksums calculations. In the preferred embodiment, a single TIB is used because the checksums operation is synchronous. The FLEXPOOL allocates space for memory management.

Figure 6:
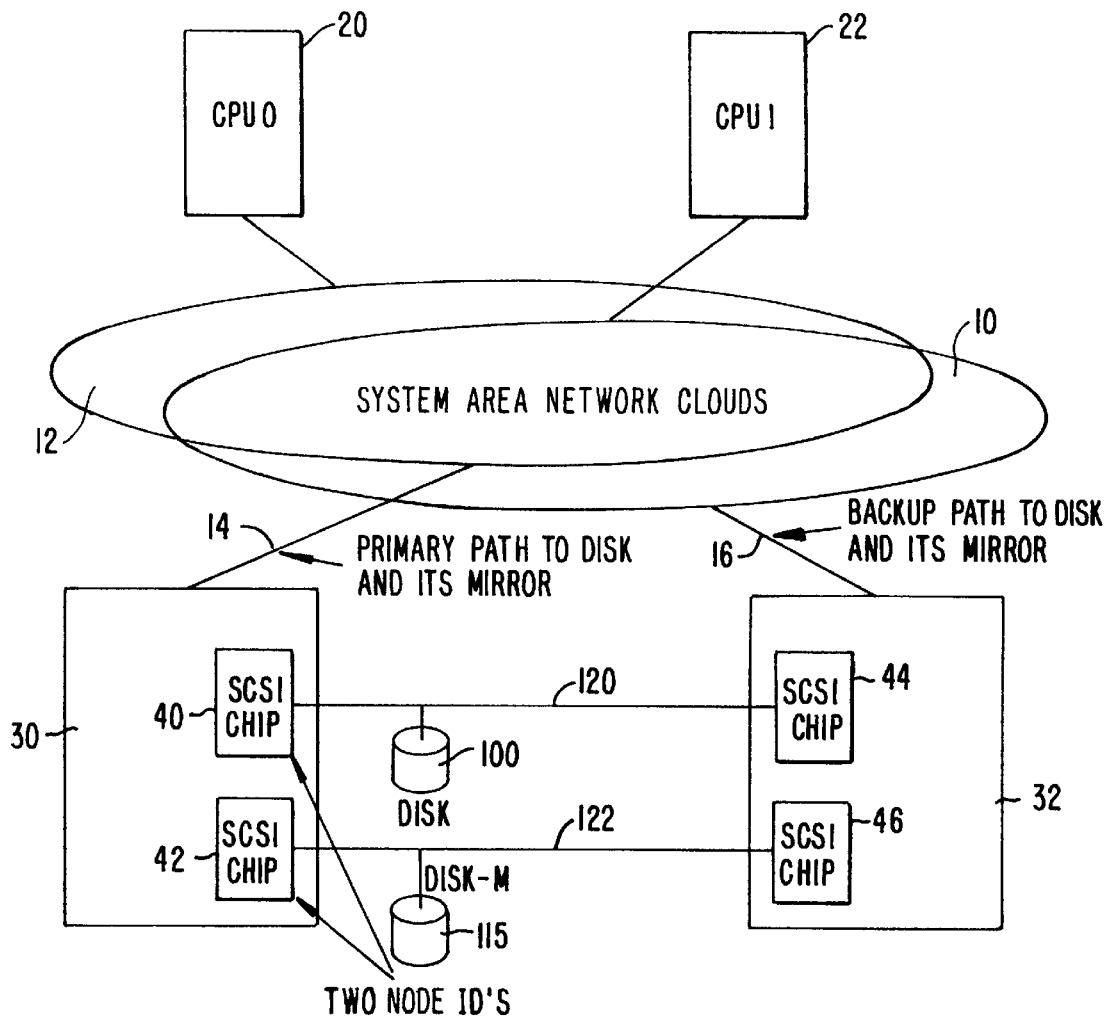
FIG. 6 illustrates how two node IDs are used for two paths to a disk and its mirror disk.

FIG. 6 illustrates how two IDs are used for two paths to a disk and its mirror disk. In the preferred embodiment, the two IDs are associated with SCSI controller chips 40 and 42. As shown in FIG. 6, these SCSI controller chips 40 and 42 provide access to disk 100 and its mirror disk 115 respectively. In the preferred embodiment, a fault tolerant system is provided with the following: CPU0 20 and CPU1 22; two SAN clouds 10 and 12; a primary path 14 to disk and its mirror 14 and a backup path 16 to disk and its mirror controllers 30 and 32; SCSI controller chips 40, 42, 44 and 46; a disk 100 and its mirror disk 115; and chains 120 and 122. In this arrangement, all components of the system have at least one redundant component as a backup (e.g., disk 100 has a backup mirror disk 115). Therefore, during a data write operation, all data transfers are made to two disks (a disk and its mirror) such that if an error occurs and correct data cannot be accessed from one disk, that data will also be located on another disk for access. This configuration results in very little, if any, data corruption. During a disk read operation, direct data transfer software maps the data buffer for access by only one of the disks 100 or 115. Thus, the buffer will be mapped into only one virtual address space.

In an alternative embodiment, four mode IDs are used for direct data transfers. In this arrangement, data buffers must be redundantly mapped into the virtual address space for access by all four SCSI controller chips 40, 42, 44 and 46. This enables the disk process to issue the data transfer request to any of the SCSI controller chips 40, 42, 44 or 46.

The direct data transfer support software is structured as a library of software routines (referred to as routines). In the preferred embodiment, the file system is a client to these routines. Thus, when the file system determines that a direct data transfer is being initiated, it calls the routines which take necessary actions to map buffers and do checksums calculations. When the direct data transfer routines are done, the file system uses the message system to send a message to the appropriate CPU containing the disk process.

Figure 7:
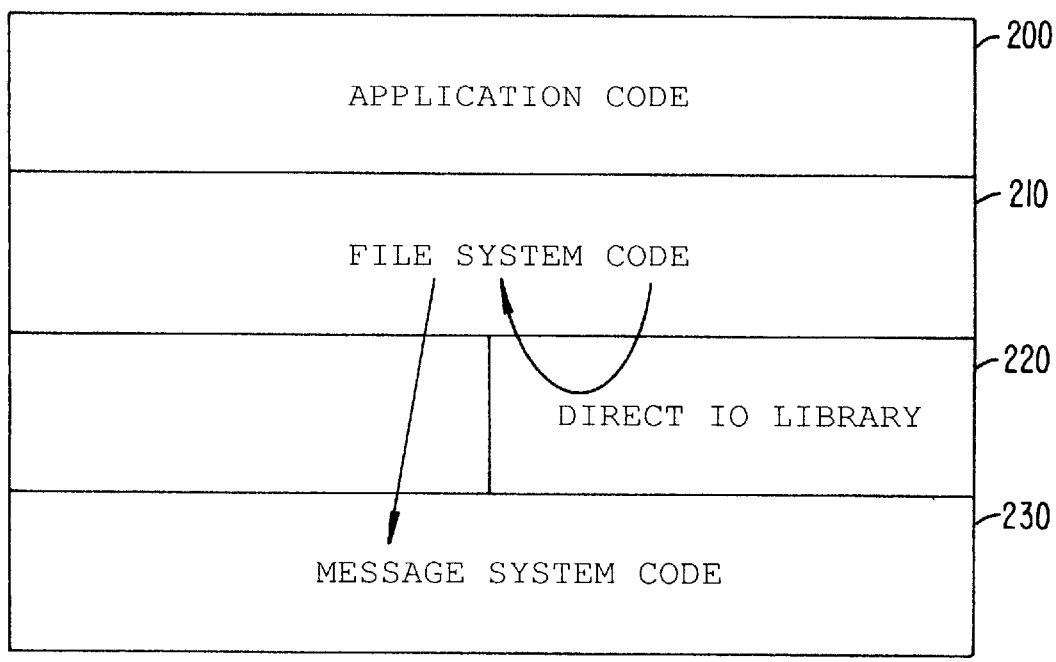
FIG. 7 is an example of system software layering with direct data transfers.

FIG. 7 is an example of system software layering with direct data transfers. As illustrated in FIG. 7, the file system 210 can call the message system 230 directly and can call the routines in direct data transfer library 220 before invoking the message system. The file system 210 calls the direct data transfer library 220 when the flag enabling direct data transfer is set. As mentioned earlier, this flag becomes set when a SETMODE 141 or a BULKREAD/BULKWRITE is performed.

If the direct data transfer is enabled at FILE_CLOSE time the file system calls a direct data transfer routine to end the direct data transfer session. This allows the direct data transfer routines to deinstall the two node IDs with the code. FILE_CLOSE time indicates no more files will be transferred.

In another embodiment of the present invention, a device handle caching scheme is used when multiple processes in the same CPU are doing direct data transfers to the same disk or tape. This avoids the replication of device handles that point to the same node ID in the CPU. When a device handle caching system is used, the direct data transfer routine checks to see if a device handle exists in the CPU when the direct data transfer session is established. If a device handle already exists, that device handle is used. Otherwise, a new device handle is created by calling the code. At FILE_CLOSE time, the device handle is not removed.

For read data transfer operations, the checksums and verification is done after completion of the data transfer. In the preferred embodiment, the direct data transfer initiation routine (1) allocates a checksums buffer, (2) maps the request processor's buffer into virtual address space, and (3) returns to the file system. The mapping is done to enable the controller to push the data over the primary path in the SAN. This mapping operation involves a processor cache sweep which makes the memory is in the request CPU consistent with the processor's cache. The file system embeds the mapped virtual addresses in its request control area. The related message is then sent to the appropriate media server process (disk process or tape process). This message from the request process indicates that the transfer is a direct data transfer. The disk process then knows that the reply data buffer and checksums buffer are mapped for access by the controller. The disk process issues a command to the controller telling it (1) what operation to perform and (2) to deposit the read data and checksums in the destination CPU (CPU containing the request process) at the specified addresses. The controller interrupts the CPU containing the disk process when the data transfer is complete. This arrangement was illustrated in FIG. 4.

In the preferred embodiment, the mapping of the request processor's buffer into virtual address space is done by a direct data transfer routine. These virtual addresses are transferred to the disk process. To facilitate this transfer, the direct data transfer routine returns the virtual addresses to the file system which embeds the virtual addresses in the request it sends to the CPU containing the disk process. When the data transfer is complete, the controller notifies the disk process via an interrupt that the request is done. When the request process receives the message that the data transfer is complete, it calls a direct data transfer routine to handle the completion of the read request. The called direct data transfer routine then calls the code to calculate the appropriate checksums for the request CPUs buffer. This checksums operation is a blocking operation. Therefore, the process is suspended while the checksums operation is in progress. The routine unblocks the calling process when the checksums calculations are complete. The direct data transfer routine then verifies that the calculated checksums match the checksums returned by the controller. The routine then returns either a success or checksums error indication to the calling file system routine.

Figure 8:
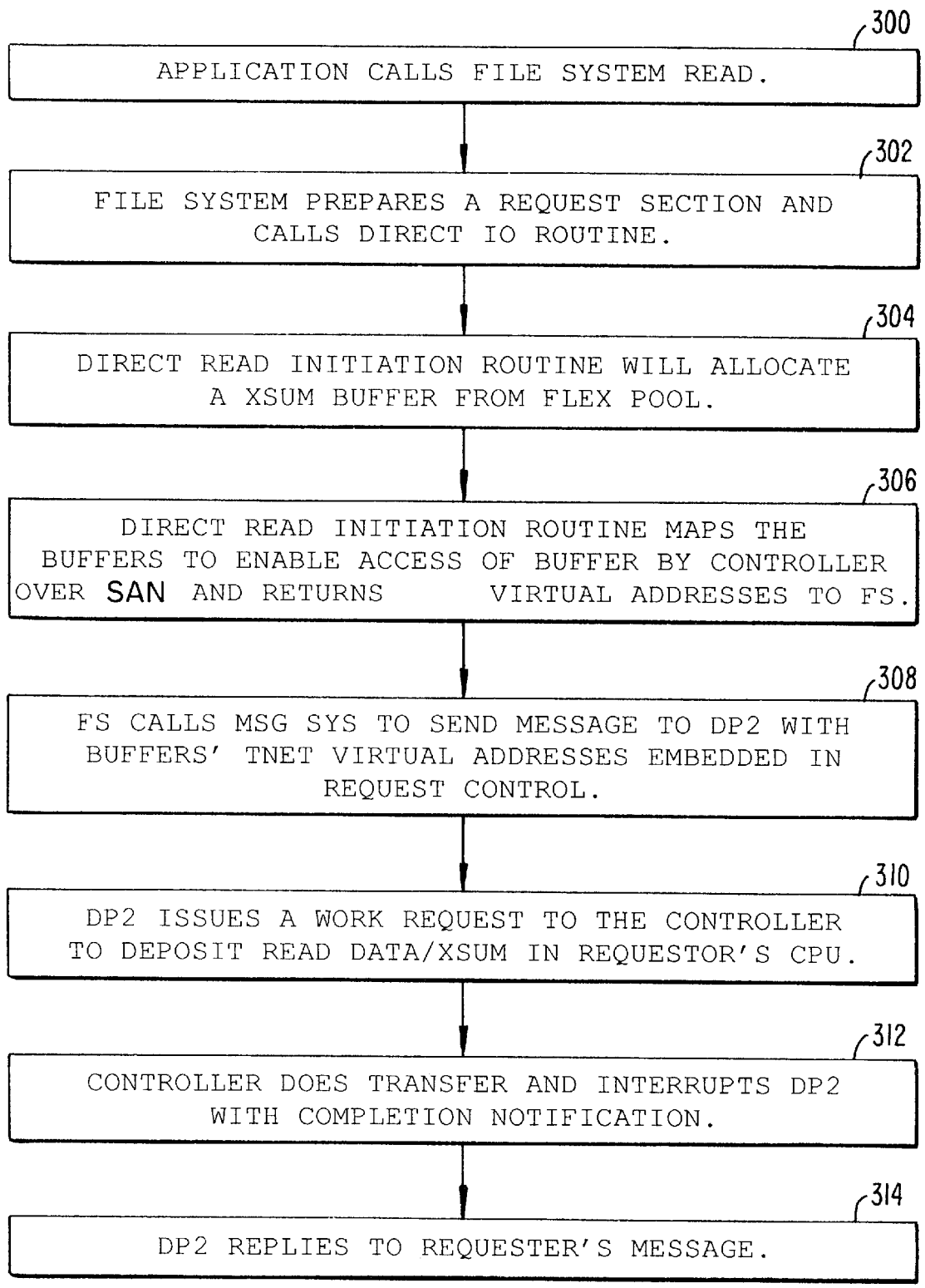
FIG. 8 illustrates the process flow with the read request path with direct data transfer.

FIG. 8 illustrates the process flow with the read request path with direct data transfer. At step 300, the application calls the file system for a read request. At step 302, the file system prepares a request section and calls the direct data transfer routine. At step 304, the direct read initiation routine allocates a checksums buffer from FLEXPOOL. At step 306, the direct read initiation routine maps the request CPUs buffer to enable access of the buffer to the controller over the SAN and returns the virtual addresses to the file system. At step 308, the file system calls the message system to send a message to the disk process. This message includes the buffers' virtual addresses which are embedded in the request section. At step 310, the disk process issues a work request to the controller. This work request is for depositing the read data and checksums in the CPU containing the request process. At step 312, the controller performs the data transfer and then interrupts the disk process with the completion notification. At step 314, the disk process replies to the request process' message.

Figure 9:
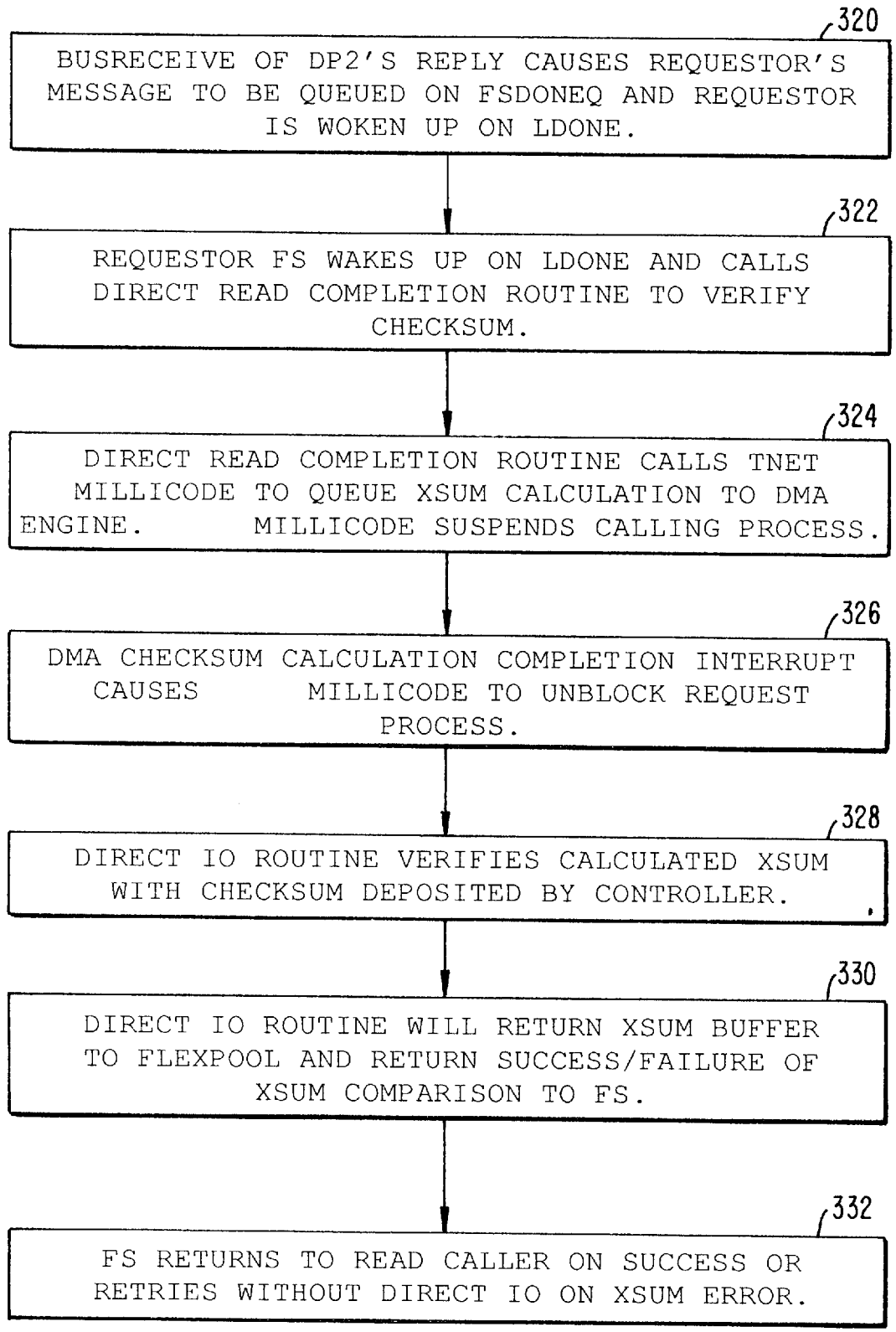
FIG. 9 illustrates the process flow for the read reply path with direct data transfer.

FIG. 9 illustrates the process flow for the read reply path with direct data transfer. At step 320, the disk process' reply causes the request process' message to be queued, and the request process is woken up. At step 322, the request process wakes up and calls the direct read completion routine to verify the checksums. At step 324, the direct read completion routine calls the code to queue the checksums calculations for the DMA engine. The code then suspends the calling process. The DMA Engine then performs the checksums calculations. At step 326, the DMA engine checksums calculations completion interrupt causes the code to unblock the request process. At step 328, the direct data transfer routine verifies the calculated checksums with the checksums deposited by the controller. At step 330, the direct data transfer routine returns the checksums buffer to FLEXPOOL and returns with the success or failure of the checksums comparisons to the file system. At step 332, in the preferred embodiment, the file system returns to the request process if the comparison is successful, or retries without direct data transfer if a checksums error occurs.

For write data transfer operations, the checksums are calculated before the data is transferred. The file system calls the direct write initiation routine and provides the address of the request CPU's buffer. The direct data transfer routine first allocates a checksums buffer and maps the relevant buffers (the request data and checksums buffers) into a virtual address space. For the write operation, the buffers are mapped into the virtual address space for access by two paths of a disk and its mirror. If this is a mirrored write, both of the related controllers will access these buffers. A mirrored write is used in the preferred embodiment.

The direct data transfer routine then calls the code to calculate the checksums of the buffer. The code then queues the checksums calculations to the request CPU's DMA engine and blocks the calling process until completion of the checksums calculations. The DMA engine computes the specified checksums and deposits the resultant checksums in the checksums buffer. A completion interrupt for the checksums calculations is then fielded by the code. The completion interrupt unblocks the request process at that time.

The direct data transfer routine resumes processing by returning four virtual addresses to the file system. Two of these virtual addresses corresponds to the request CPU's buffer. The other two virtual addresses correspond to the checksums buffer. The file system write routine embeds these four virtual addresses into the request control section of its message and then calls the message system to send the associated message to the disk process. In the preferred embodiment, in order to avoid data corruption, the request process buffers are mapped to only one controller when a disk read is performed.

The disk process, upon receipt of this direct data transfer write request, sends the appropriate work request to the SCSI controllers. This work request specifies that the data and checksums buffers come from the CPU containing the request process, but that the request completion interrupt from the controller should go to the CPU containing the disk process. The controller then pulls the data for the write operation from the request process' CPU. The data is then written to the physical medium, and the disk process is notified via an interrupt upon completion. The disk process waits for the completion interrupt from both the primary and mirror disk halves. After both disks have completed the operation, the disk process replies to the request process' message.

When the reply sent by the disk process arrives at the request process's CPU, the CPU wakes up the request process. The file system then calls the direct data transfer routine to deal with the write completion. In this case, the direct data transfer routine unmaps the buffers from the virtual address space, deallocates the checksums buffer and returns to the file system. The file system then notifies its user of the completion of the write request.

Figure 10:
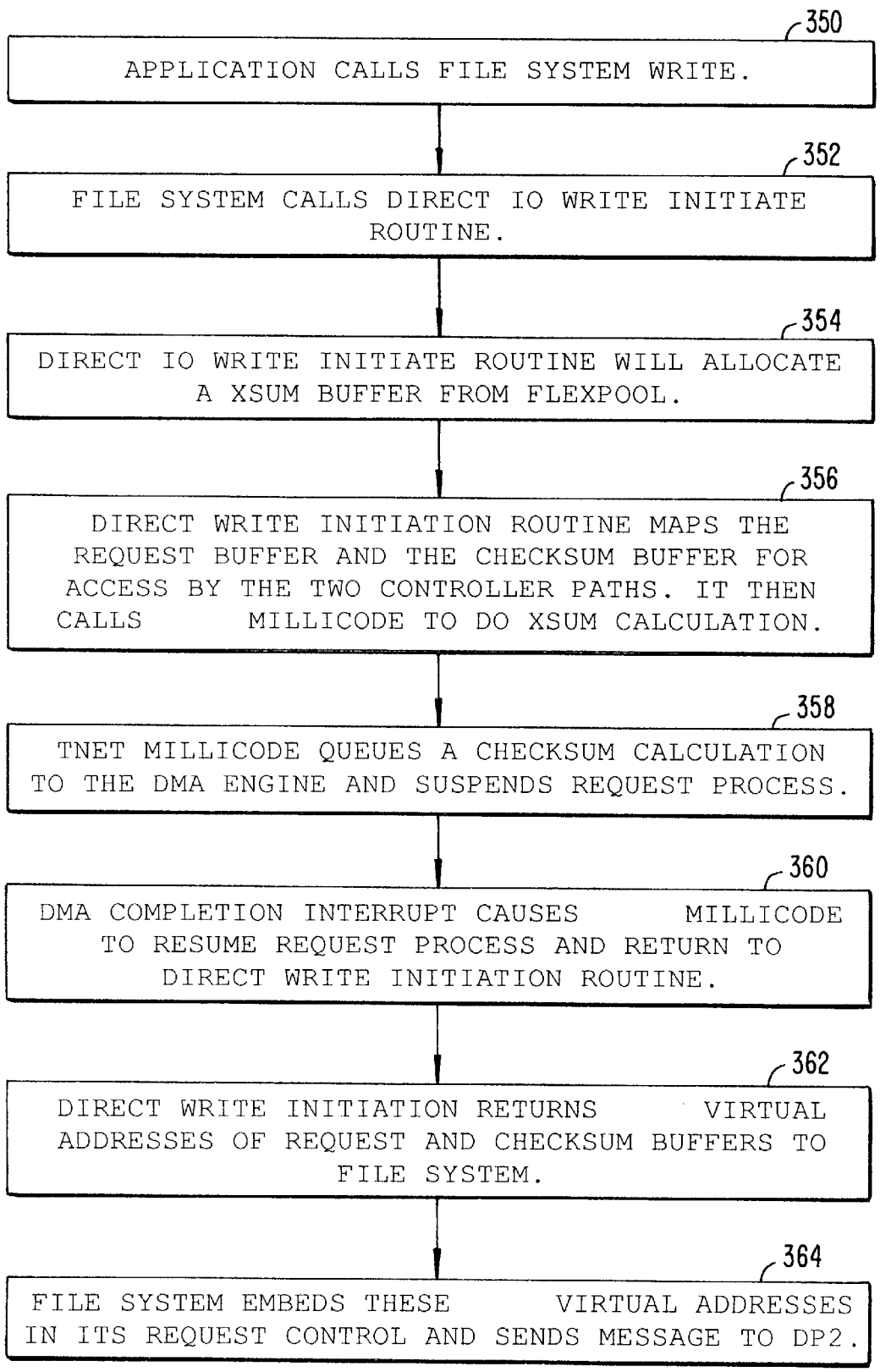
FIG. 10 illustrates the process flow for a write request path with direct data transfer.

FIG. 10 illustrates the process flow for a write request path with direct data transfer. At step 350, the application calls the file system for the write operation. At step 352, the file system calls the direct data transfer write initiate routine. At step 354, the direct data transfer write initiate routine allocates a checksums buffer from the FLEXPOOL. At step 356, the direct data transfer write initiation routine maps the request CPU's buffer and the checksums buffer for access by the two controller paths. The routine then calls the code to do the checksums calculations. At step 358, the code queues the checksums calculations to the DMA engine and suspends the request process. At step 360, the completion interrupt causes the code to resume the request process and to return to the direct write initiation routine. At step 362, the direct data transfer write initiation returns the virtual addresses of the request and checksums buffers to the file system. At step 364, the file system embeds these virtual addresses in its request control area and sends this message to the disk process.

Figure 11:
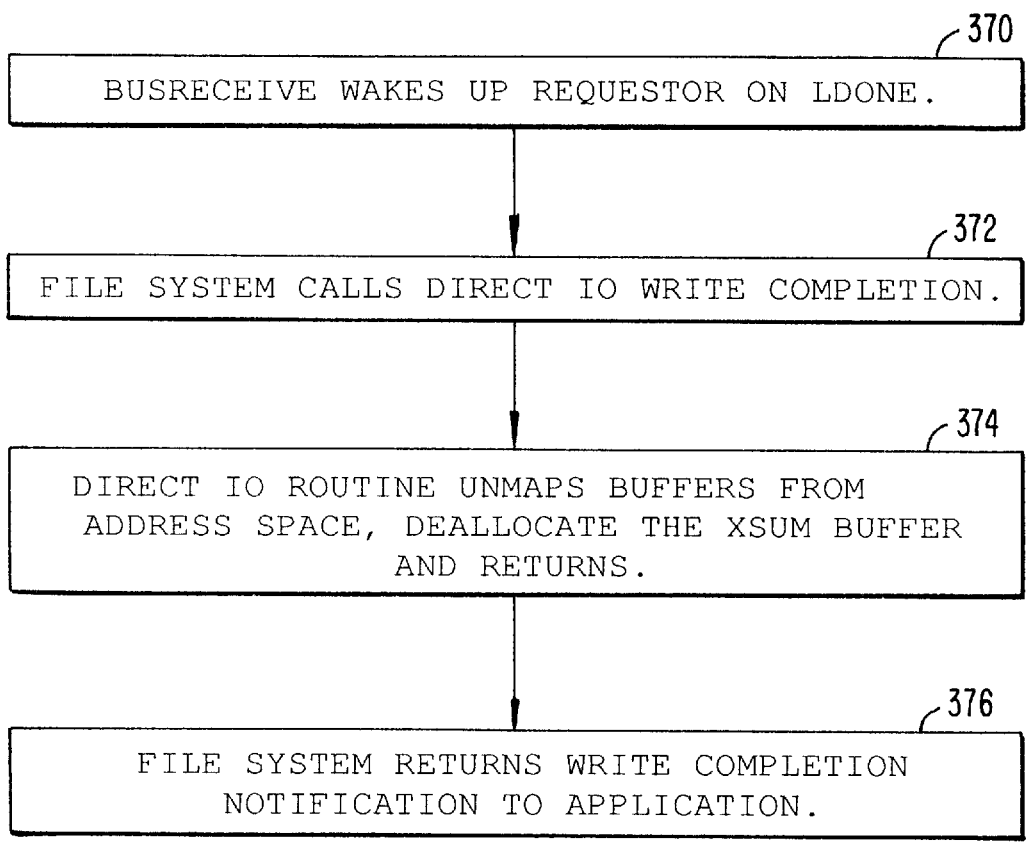
FIG. 11 illustrates the process flow for a write reply path with direct data transfer.

FIG. 11 illustrates the process flow for a write reply path with direct data transfer. At step 370, the code wakes up the request process. At step 372, the file system calls the direct data transfer write completion routine. At step 374, this direct data transfer routine unmaps the buffers from the virtual address space, deallocates the checksums buffer and returns. At step 376, the file system returns a write completion notification to the application.

In the preferred embodiment, the space for the checksums buffers is allocated by the direct data transfer library routines. This space is allocated from the FLEXPOOL. In an alternative embodiment, the file system allocates the space for the checksums buffers. The size of the checksums buffer depends on the request CPU's buffer size and the sector/block size.

In the preferred embodiment, the file system client who initiated the direct data transfer operation can also cancel that operation. This cancellation can be done at the end of a data transfer or while outstanding data transfer requests are present. When a direct data transfer operation is cancelled in this manner, the file system calls a direct data transfer routine to perform the cancellation. This routine is responsible for unmapping the buffers from the virtual address space and for returning the associated checksums buffer to their pool. The file system then sends a cancel notification to the appropriate disk process. After these two operations are complete, the direct data transfer operation is deemed cancelled. When the direct data transfer routine unmaps a buffer, the controller will encounter errors if it tries to access this buffer. These errors are reported to both the controller and the CPU containing the request process. In the preferred embodiment, the controller stops accessing the buffer after the first error is encountered.

In the preferred embodiment, the node ID of all the CPUs in the system are registered with the firmware. This registration is in the form of a "set parameters" mailbox command in the firmware. In response to this mailbox command, the firmware returns an 8-bit handle. This handle is used by the SCSI module driver to identify the host processor to the firmware. This registration of node IDs allows for direct data transfer between request processors (processors containing the request process) and storage units (units containing disks).

The examples discussed thus far only consider the case when the request process and the disk process are located in different CPUs. If these two processes are located in the same CPU, direct data transfer can still be utilized. When direct data transfer is used in this example, the CPU copy of the buffer between the request process and the disk process is still avoided. Therefore, direct data transfer is also desirable when both the request process and disk process are located in the same CPU.

While disks were used as the storage devices in the above examples, any storage device can be used for the direct data transfer. For example, direct data transfer can be used on tape I/O to avoid unnecessary data copies. If that I/O does not include the checksums calculations, direct data transfer would be simpler than in the disk case. If the tape process also supports direct data transfer, the backup and restore utilities can take advantage of this feature. For example, when the disk process, the tape process and the backup/restore process are all scattered in three different CPUs, direct data transfers would avoid two unnecessary buffer copies.

In the preferred embodiment, the following software code excerpts provide the interface routines in the direct data transfer library. The first excerpt is for the direct data transfer session start routine (see directly below this paragraph). This routine is called by the file system when it receives an indication from a disk process that it can support direct data transfer requests. The disk process responds to the SETMODE 141/bulk data transfer requests with this indication. The response from the disk process also contains information used by the direct data transfer routines, such as node IDs, packetizer types, and the like. This information is passed on to the direct data transfer session start routine by the file system.

```
/*
**    Returns 0 upon success
**              an error code upon failure
**    iop_cookie is an input pointer to the area that the IOP returned to the
**              File System to pass on to the Direct IO routines.
**              The File System should not care
**              about the internal format of this area. The format of this area would be
**              an agreement between the IOPs and the Direct IO routines. This area
**              will contain the Tnet IDs of the controller, the type of the packetizer
**              in the controller, etc.
**
**    directio_cookie is a pointer to an area where directio can store some
**              of its context for the directio session. Aside from allocating storage for
**              this area, the File System should not care about the format of this area.
**
**    The size of the cookie areas is TBD.
*/
int DirectIO_Session_Start(void *iop_cookie, void *directio_cookie);
{
        look at iop cookie and see how many tnet ids are in it.
        call tser_dev_install to install these tnet ids. Ask tser_dev_install not to
            worry about allocating interrupt and barrier AVTs.
        call tser_dev_set_packetizer to set the packetizer to the type specified
            in the iop_cookie.
        call tser_dev_set_tnetid to set the tnet id in the installed device handle.
        store the returned device handles in the directio cookie area.
        allocate a Tib from FLEXPOOL and store the TIB address in the
            directio_cookie area.
}
```

The direct data transfer session end routine is called by the file system at FILE_CLOSE time or when a SETMODE 141 is done to disable large data transfers.

```
/*
**  Returns 0 upon success
**          an error code upon failure.
**
**  directio_cookie is a pointer to the area that was initialized during the
**                  directio_session_start call.
*/
int DirectIO_Session_End(void *directio_cookie)
{
        call tser_dev_remove to uninstall the Tnet IDs.
        deallocate the TIB buffer by returning it to the FLEXPOOL.
}
```

The direct read start routine is called by the file system prior to initiating a direct data transfer read request.

```
/*
**  Returns 0 upon success
**          an error code upon failure.
**
**  directio_cookie is a pointer to the direct io session information that was
**                  initialized during directio session start.
**  buffer is a pointer to the buffer into which data should be read.
**  buffer_size is the size of the above buffer.
**  tnet_vaddrs is a pointer to an array of two 32 bit integers. Two tnet
**          virtual addresses will be deposited there by Direct_Read_Start.
**          These two tnet vaddrs then need to be copied to the Request Control
**          and sent on to the IOP.
**  xsum_buffer is a pointer to a 32 bit integer location. Direct_Read_Start
**          deposits the address of the xsum buffer it allocated in this location.
**          This address needs to be passed to Direct_Read_End or
**          Direct_Read_Abort.
*/
int Direct_Read_Start(void *directio_cookie, void *buffer, int buffer_size,
                      void *tnet_vaddrs, void *xsum_buffer)
{
        *xsum_buffer = allocate the checksum buffer from the Flex Pool.
        map the user buffer and the checksum buffer for write access by the
                device handle stored in the directio_cookie.
        deposit the two tnet virtual addresses returned by the map routine into the
                area pointed at by tnet_vaddrs.
}
```

The direct read end routine is called by the file system when it receives a response to the direct data transfer read request from the disk process. If the disk process response indicates success, the direct read end routine will do the checksums verification. In all cases, the direct read end routine will unmap the buffers and deallocate the checksums buffer.

```
/*
**  Returns 0 upon success
**          an error code upon failure. One such failure could be checksum mismatch.
**
**  tnet_vaddrs is a pointer to the two tnet virtual addresses that were created
**          during the call to Direct_read_start.
**  iop_returned_status is the status code that the IOP returned in its response to
**          the read request sent by the File System.
**  xsum_buffer is the 32 bit address of the checksum buffer that Direct_Read_Start
**          allocated.
*/
int Direct_Read_End(void *directio_cookie, void *tnet_vaddrs, int iop_returned_status,
                    void xsum_buffer)
{
        unmap the two tnet virtual addresses listed in the tnet_vaddrs array.
        if (iop_returned_status == success)
        {
            use the TIB from the directio cookie area.
            call tser_transfer to calculate checksum.
            compare device returned checksum to calculated checksum.
            set return value.
        }
        return xsum_buffer to FLEXPOOL.
        return return_value
}
```

The direct write start routine is called by the file system prior to initiating a direct data transfer write request.

```
/*
**   Returns 0 upon success.
**           otherwise an error code is returned.
**
**   directio_cookie is a pointer to the area of memory that belongs to Direct IO
**           that is allocated by the File System.
**
**   buffer is a pointer to the user buffer that is being written to the media.
**   buffer_size is the size of the above buffer.
**   tnet_vaddrs is a pointer to an array of four 32 bit integers. The array needs to
**       be allocated by the file system. Direct IO routines will deposit four Tnet
**       virtual addresses into this array — two for the xsum buffer and two for the user
**       buffer. The FS needs to copy these four into the request control it sends to
**       the IOP.
**   xsum_buffer is a pointer to a 32 bit location where Direct_Write_Start will
**           deposit the address of the allocated xsum buffer. This address needs
**           to be passed to Direct_Write_End or Direct_Write_Abort.
*/
int Direct_Write_Start(void *directio_cookie, void *buffer, int buffer_size,
                       void *tnet_vaddrs, void *xsum_buffer)
{
    *xsum_buffer = allocate a xsum buffer from the FLEXPOOL.
    call the Tnet millicode map routines to map the xsum and user buffers for
            access by the disk and its mirror.
    deposit the Tnet virtual addresses returned above into tnet_vaddrs array.
    use the TIB whose address we stored in the directio_cookie.
    call tser_transfer to calculate checksum of buffer.
}
```

The direct write end routine is called by the file system when a reply to a direct data transfer write request is received from a disk process.

```
**   Returns 0 upon success.
**       an error code is returned otherwise.
**
**   directio_cookie is a pointer to the area of File System memory where directio
**           session information is stored.
**   tnet_vaddrs is a pointer to an array of four 32 bit ints. This is the same as the
**           array which was passed into direct_write_start.
*/
int Direct_Write_End(void *directio_cookie, void *tnet_vaddrs, void *xsum_buffer)
{
    call tnet millicode to unmap the four tnet virtual addresses listed in
            tnet_vaddrs.
    deallocate xsum_buffer.
}
```

The direct read abort routine is called by the file system after it has cancelled the direct data transfer read request which it has sent to the disk process. The disk process is informed of the cancellation, and then the direct data transfer routine is called to clean up the request.

```
/*
**   Returns 0 upon success.
**       an error code is returned otherwise.
**   directio_cookie is a pointer to the area of the File System memory where directio
**           session information is stored.
**   tnet_vaddrs is a pointer to an array of two 32 bit ints. This is the same as the
**           array which was passed into direct_read_start.
**   xsum_buffer is the 32 bit address of the checksum buffer that Direct_Read_Start
**           allocated.
*/
int Direct_Read_Abort(void *directio_cookie, void *tnet_vaddrs, void *xsum_buffer)
{
    call tnet millicode to unmap the two tnet virtual addresses listed in
            tnet_vaddrs.
    deallocate xsum_buffer.
}
```

The direct write abort routine is called by the file system after it has cancelled the direct data transfer write message which it sent to the disk process. The disk process is informed about the cancellation, and then the direct data transfer routine is called to clean up the request.

data are transmitted in data packets, each of said data packets including a destination node identification, a source node identification, said virtual memory address, and a plurality of data words.

```
/*
**  Returns 0 upon success.
**      an error code is returned otherwise.
**
**  directio_cookie is a pointer to the area of File System memory where directio
**          session information is stored.
**  tnet_vaddrs is a pointer to an array of four 32 bit ints. This is the same as the
**          array which was passed into direct_write_start.
**  xsum_buffer is the 32 bit address of the checksum buffer allocated by
**          Direct_Write_Start.
*/
int Direct_Write_Abort(void *directio_cookie, void *tnet_vaddrs, void *xsum_buffer)
{
    call tnet millicode to unmap the four tnet virtual addresses listed in
            tnet_vaddrs.
    deallocate xsum_buffer.
}
```

As stated above, the checksums are calculated using the block transfer engine within each CPU. Thus, the checksums can be calculated asynchronously, without CPU intervention. The software sub-system in every CPU is responsible for performing checksums calculations. In an alternative embodiment, the checksums calculations could be performed in the file system code. In this example, an interrupt handler is used to handle the completion interrupt of the checksums calculations because the code only provides an asynchronous interface. In yet another embodiment, the code provides a synchronous interface. In this arrangement, the checksums can be performed in the file system layer without any interrupt handler.

While a full and complete disclosure of the invention has been made, it will become apparent to those skilled in this art that various alternatives and modifications can be made to various aspects of the invention without departing from the true scope of the claims which follow.

What is claimed is:

1. In a data processing system for transferring data in which a plurality of central processing units (CPUs) and at least one storage unit are interconnected by a network, said CPUs including a request CPU having a request process, access to said storage unit being controlled by one of said CPUs, a method of direct transfer of data between said storage unit and said request CPU, comprising the steps of:
   a) the request process creating a virtual memory address indicative of a memory buffer of said request CPU;
   b) the request process sending to said one of said CPUs said virtual memory address and a storage unit access request;
   c) the one of said CPUs sending to said storage unit: a work request including said virtual memory address;
   d) responding to said work request; and
   e) interfacing directly with said request CPU for the transfer of data between the storage unit and said memory buffer.

2. The method of direct transfer of data between said storage unit and said request CPU of claim 1, wherein said direct transfer of data allows said request CPU to read data from said storage unit into said by buffer at said virtual memory address.

3. The method of direct transfer of data between said storage unit and said request CPU of claim 2, wherein the 4. The method of direct transfer of data between said storage unit and said request CPU of claim 3, further comprising the step of advising said one of said CPUs after each packet is transmitted to said request CPU.

5. The method of direct transfer of data between said storage unit and said request CPU of claim 4, further comprising the step of checking validity of the data as received from said storage unit.

6. The method of direct transfer of data between said storage unit and said request CPU of claim 2, wherein said storage unit includes two disks with the same data, said storage unit access request including an address to one of two said disks.

7. The method of direct transfer of data between said storage unit and said request CPU of claim 1, wherein said direct access allows said request CPU to write into said storage unit, said storage unit accessing said memory buffer at said virtual address for transfer of the data.

8. The method of direct transfer of data between said storage unit and said request CPU of claim 7, wherein the data are transmitted in data packets, each of said data packets including a destination node identification, a source node identification, said virtual memory address, and a plurality of data words.

9. The method of direct transfer of data between said storage unit and said request CPU of claim 8, further comprising the step of checking validity of the data prior to storing the data in the memory buffer at said virtual memory address for access by said storage unit.

10. The method of direct transfer of data between said storage unit and said request CPU of claim 9, wherein said storage unit includes two disks for storing the same data, said direct access request including addresses to said two disks whereby data is written into both of said two disks.

11. The method of direct transfer of data between said storage unit and said request CPU of claim 1, wherein said request CPU is said one of said CPUs controlling said storage unit.

12. The method of direct transfer of data between said storage unit and said request CPU of claim 1, wherein each of said CPUs includes at least a pair of processor elements operating in lock-step, self-checking configuration, and executing substantially identical instructions substantially simultaneously.

13. The method of direct transfer of data between said storage unit and said request CPU of claim 1, further comprising the step of routing data between said CPUs and said storage units.

14. The method of direct transfer of data between said storage unit and said request CPU of claim 13, wherein said routing involves using a plurality of port means coupled to said CPUs and storage units for transferring data between said CPUs and said storage units, said port means being configured to provide simultaneous bi-directional communication between said port means and said CPUs or said storage units.

15. The method of direct transfer of data between said storage unit and said request CPU of claim 1, wherein said CPUs each include at least a pair of processor elements configured to operate in lock-step, self-checking configuration to execute a stream of instructions.

16. The method of direct transfer of data between said storage unit and said request CPU of claim 1, wherein said storage units include physical mediums for storing said data, and wherein said storage units are capable of sending messages.

17. The method of direct transfer of data between said storage unit and said request CPU of claim 16, further comprising the steps of:

receiving said messages from said storage units; and determining from the information contained in said messages whether access to said physical mediums is to be granted or not;

wherein a table containing a plurality of entries is utilized, each of said entries identifying a grant of access to at least a portion of said physical mediums.

18. The method of direct transfer of data between said storage unit and said request CPU of claim 17, wherein a device handle provides remote node identification information for said entries, said remote node identification information used for said determining.

19. The method of direct transfer of data between said storage unit and said request CPU of claim 18, wherein each of said plurality of entries includes identity data indicative of a corresponding one of said storage units, and wherein access to said one of said storage units is denied if said identity data and said information contained in said messages do not match.

20. The method of direct transfer of data between said storage unit and said request CPU of claim 1, wherein said storage units include storage controllers and physical mediums, said storage controllers and said physical mediums each working in pairs, wherein at least two of said storage controllers can access one of said physical mediums.

21. The method of direct transfer of data between said storage unit and said request CPU of claim 20, wherein said request CPU reads data from said physical medium in said storage unit into said buffer memory at said virtual memory address, and wherein at least four different paths are provided between said request CPU and said physical medium for said transfer of data.

22. In a processing system including plural processing elements, each having memory, interconnected with a storage element for communication therebetween, a method of data transfer between the storage element and the plural processing elements, including the steps of:

a one of the plural processing elements having a request process for requesting a data transfer by a data transfer request that includes a virtual memory address indicative of a memory location in the memory of the one of the plural processing elements;

a one of the plural processing elements having a control process to initiate a data transfer with the storage element in response to receipt of the data transfer request;

initiating a data transfer between the memory location and the storage element by transferring the virtual memory address from control process to the storage element in response to receipt by the control process of the data transfer request.

23. The method of claim 22, wherein a first one of the processing elements has the request process and a second one of the processing elements has the control process.

24. A method of transferring data between a storage unit and one of plural data processor units of a processing system, the one of the plural data processor units including a memory storage element and a request process for requesting the data transfer, the system having a control process running on the plural data processor units for initiating the data transfer, the method including the steps of:

sending a data transfer request from the request process to the control process, including a virtual memory address indicative of a location in the memory storage element;

transferring the virtual memory address from the control process to the storage element;

transferring data between the storage element and the location in the memory storage using the virtual memory address under control of the storage element.

25. A processing system, comprising:

a plurality of processor units, including a one processor unit having a storage memory;

a storage unit;

a communication medium interconnecting the plurality of processor units and the storage unit for transferring data therebetween;

a request process running on the one processor unit for requesting a data transfer between the storage unit and a memory location in the storage memory by sending a data transfer request including a virtual memory address indicative of the memory location; and a control process for receiving and responding to the data transfer request to initiate the data transfer between the storage element and the memory location by providing to the storage element the virtual memory address.

26. The processing system of claim 25, wherein the control process is operating on another of the plurality of processor units different from the one of the plurality of processor units.

* * * * *